(12) United States Patent
Hwang et al.

(10) Patent No.: US 7,523,686 B2
(45) Date of Patent: Apr. 28, 2009

(54) SYSTEM OF LUBRICATING OIL LINE FOR AUTOMATIC TRANSMISSION

(75) Inventors: Gwang Soo Hwang, Gunpo (KR); Hyunchul Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 402 days.

(21) Appl. No.: 11/590,990

(22) Filed: Nov. 1, 2006

(65) Prior Publication Data

US 2007/0131053 A1    Jun. 14, 2007

(30) Foreign Application Priority Data

Dec. 9, 2005    (KR)    ............ 10-2005-0120954

(51) Int. Cl.
*F16H 57/04*    (2006.01)
*F16H 61/00*    (2006.01)

(52) U.S. Cl. ............... 74/606 R; 74/606 A

(58) Field of Classification Search ......... 74/606 R, 74/606 A; 184/1.5, 6.12, 105.3; 475/159
See application file for complete search history.

(56) References Cited

U.S. PATENT DOCUMENTS

| | | | | |
|---|---|---|---|---|
| 3,220,185 | A * | 11/1965 | Christenson et al. | ...... 60/360 |
| 4,203,331 | A * | 5/1980 | Shindo et al. | ......... 74/606 R |
| 4,364,285 | A * | 12/1982 | Morisawa et al. | ..... 74/606 R |
| 4,621,710 | A * | 11/1986 | Tsukamoto et al. | ...... 184/6.27 |
| 5,014,741 | A * | 5/1991 | Taguchi | ............ 184/6.12 |
| 6,860,366 | B2 * | 3/2005 | Hori et al. | ............ 184/52 |
| 7,448,977 | B2 * | 11/2008 | Janson et al. | ........... 475/200 |

* cited by examiner

*Primary Examiner*—Tisha D Lewis
(74) *Attorney, Agent, or Firm*—Morgan, Lewis & Bockius LLP

(57) ABSTRACT

A system of oil lines for a transmission includes a first transmission case oil line connected to an oil port; a rear cover oil line connected to the first transmission case oil line, and to rear transfer bearings via a second transmission case oil line; an internal oil line receiving oil from the rear cover oil line; a branched oil line connected to the second transmission case oil line and to an inclined oil line; a third transmission case oil line receiving oil from the inclined oil line and connected to rear differential bearings via a fourth transmission case oil line; a first converter housing oil line connecting the third transmission case oil line to front transfer bearings; a second converter housing oil line transmitting oil to front differential bearings; and a connecting pipe connecting the first converter housing oil line to the second converter housing oil line.

12 Claims, 5 Drawing Sheets

SYSTEM OF LUBRICATING OIL LINE FOR AUTOMATIC TRANSMISSION

CROSS-REFERENCE TO RELATED APPLICATION

This application claims priority to and the benefit of Korean Patent Application No. 10-2005-0120954 filed in the Korean Intellectual Property Office on Dec. 9, 2005, the entire contents of which are incorporated herein by reference.

BACKGROUND OF THE INVENTION (a) Field of the Invention

The present invention relates to a system of lubricating oil lines for an automatic transmission. More particularly, the present invention relates to a system of lubricating oil lines in which the system is supplied lubricating oil directly from an oil port of a valve body and supplies lubricating oil to hydraulic driving portions through the lubricating oil lines, and the system supplies sufficient oil automatically and continually to transfer bearings and differential bearings, and thereby the durability of the bearings may be conserved.

(b) Description of the Related Art

Generally, in an automatic transmission of a front-wheel drive vehicle, a planetary gear set, a plurality of clutches, and a plurality of brakes are combined to form a gear train on an input shaft connected with a torque converter.

A transfer shaft is disposed to a side of the input shaft, and transfer gears are disposed on the transfer shaft, wherein the transfer gears transmit power from an operational element of the planetary gear set, and the transfer gears down-shift.

When positions of constituent elements to be lubricated, for example, transfer bearings, are higher than an oil level, an amount of oil splashed and supplied by a differential gear is not sufficient, and so durability of the bearings is deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a system of lubricating oil lines for an automatic transmission. The system is supplied lubricating oil directly from an oil port of a valve body, and supplies lubricating oil to hydraulic driving portions through the lubricating oil lines, and the system supplies sufficient oil automatically and continually to transfer bearings and differential bearings, and thereby, the durability of the bearings may be conserved.

The system may include: an oil port disposed in a valve body for supplying lubricating oil; a first transmission case oil line in a rear portion of a transmission case, connected to the oil port for receiving the lubricating oil from the oil port; a rear cover oil line connected to the first transmission case oil line for receiving the lubricating oil from the first transmission case oil line; a second transmission case oil line in the rear portion of the transmission case for transmitting lubricating oil from the rear cover oil line to rear transfer bearings; an internal oil line disposed in an input shaft for receiving lubricating oil from the rear cover oil line; a branched oil line connected to the second transmission case oil line for receiving lubricating oil from the second transmission case oil line; an inclined oil line formed along an inclined surface of the transmission case for receiving lubricating oil from the branched oil line; a third transmission case oil line in the transmission case for receiving lubricating oil from the inclined oil line; a fourth transmission case oil line for transmitting lubricating oil from the third transmission case oil line to rear differential bearings; a first converter housing oil line for transmitting lubricating oil from the third transmission case oil line to front transfer bearings; a second converter housing oil line disposed substantially vertically in a converter housing for transmitting lubricating oil to front differential bearings; and a connecting pipe connecting the first converter housing oil line to the second converter housing oil line.

An end of the rear cover oil line, neighboring a connection of the rear cover oil line and the first transmission case oil line, may include a ball-fitting. An end of the branched oil line, connected to an outer side of the transmission case, may include a ball fitting. An end of the inclined oil line, connected to an outer side of the transmission case, may include a ball fitting. An end of the fourth transmission case oil line, connected to an outer side of the transmission case, may include a ball fitting. An end of the first converter housing oil line, neighboring a connection of the first converter housing oil line and the third transmission case oil line, may include a sealing bolt. An end of the second converter housing oil line, connected to an outer side of the converter housing, may include a ball fitting.

Oil may be supplied to the rear transfer bearings through the oil port, the first transmission case oil line, the rear cover oil line, and the second transmission case oil line sequentially. Oil may be supplied to the front transfer bearings through the oil port, the first transmission case oil line, the rear cover oil line, the second transmission case oil line, the branched oil line, the inclined oil line, the third transmission case oil line, and the first converter housing oil line sequentially. Oil may be supplied to the rear differential bearings through the oil port, the first transmission case oil line, the rear cover oil line, the second transmission case oil line, the branched oil line, the inclined oil line, the third transmission case oil line, and the fourth transmission case oil line sequentially. Oil may be supplied to the front differential bearings through the oil port, the first transmission case oil line, the rear cover oil line, the second transmission case oil line, the branched oil line, the inclined oil line, the third transmission case oil line, the first converter housing oil line, the connecting pipe, and the second converter housing oil line sequentially.

The connecting pipe may include first and second ends, each including a hole, wherein the first end is connected to the first converter housing oil line, and the second end is connected to the second converter housing oil line.

DETAILED DESCRIPTION OF THE PREFERRED EMBODIMENTS

An exemplary embodiment of the present invention will hereinafter be described in detail with reference to the accompanying drawings.

Figure 1:
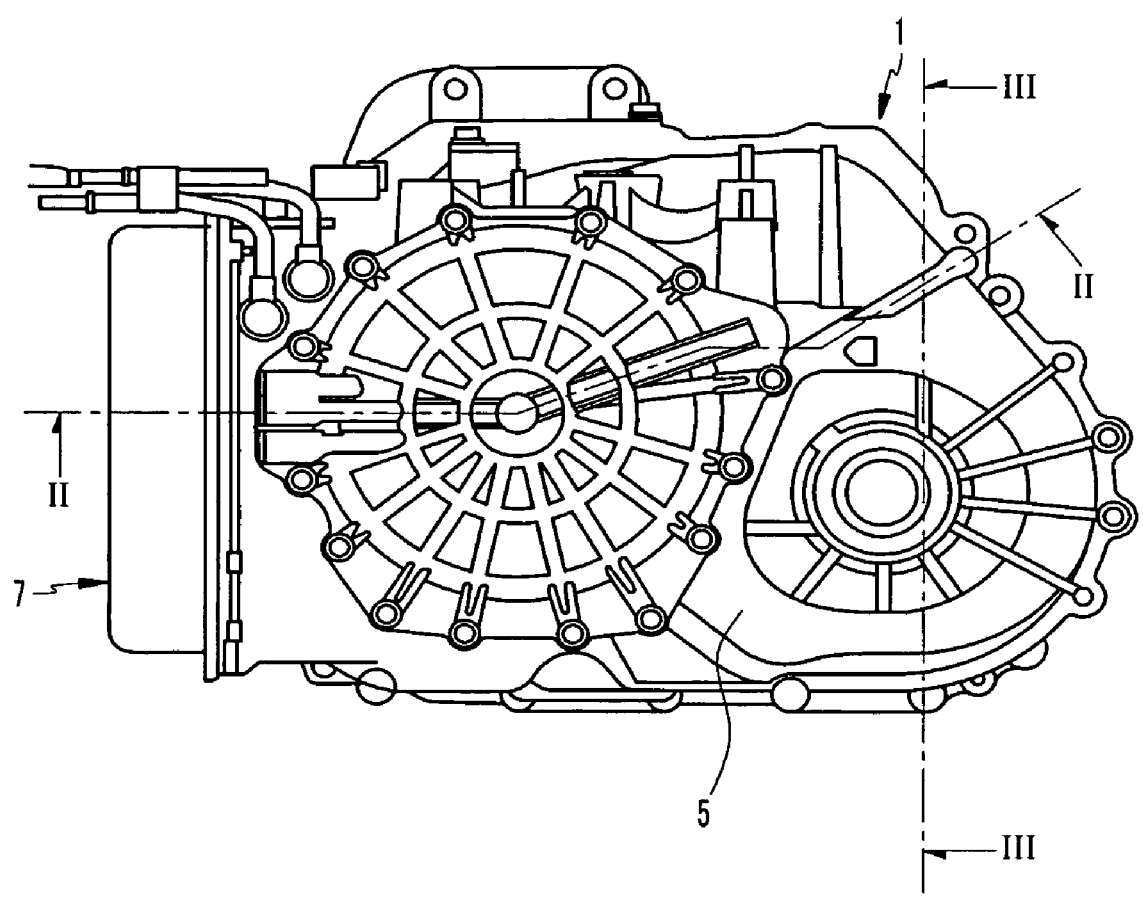
FIG. 1 is a front view of an automatic transmission according to an exemplary embodiment of the present invention.
Figure 2:
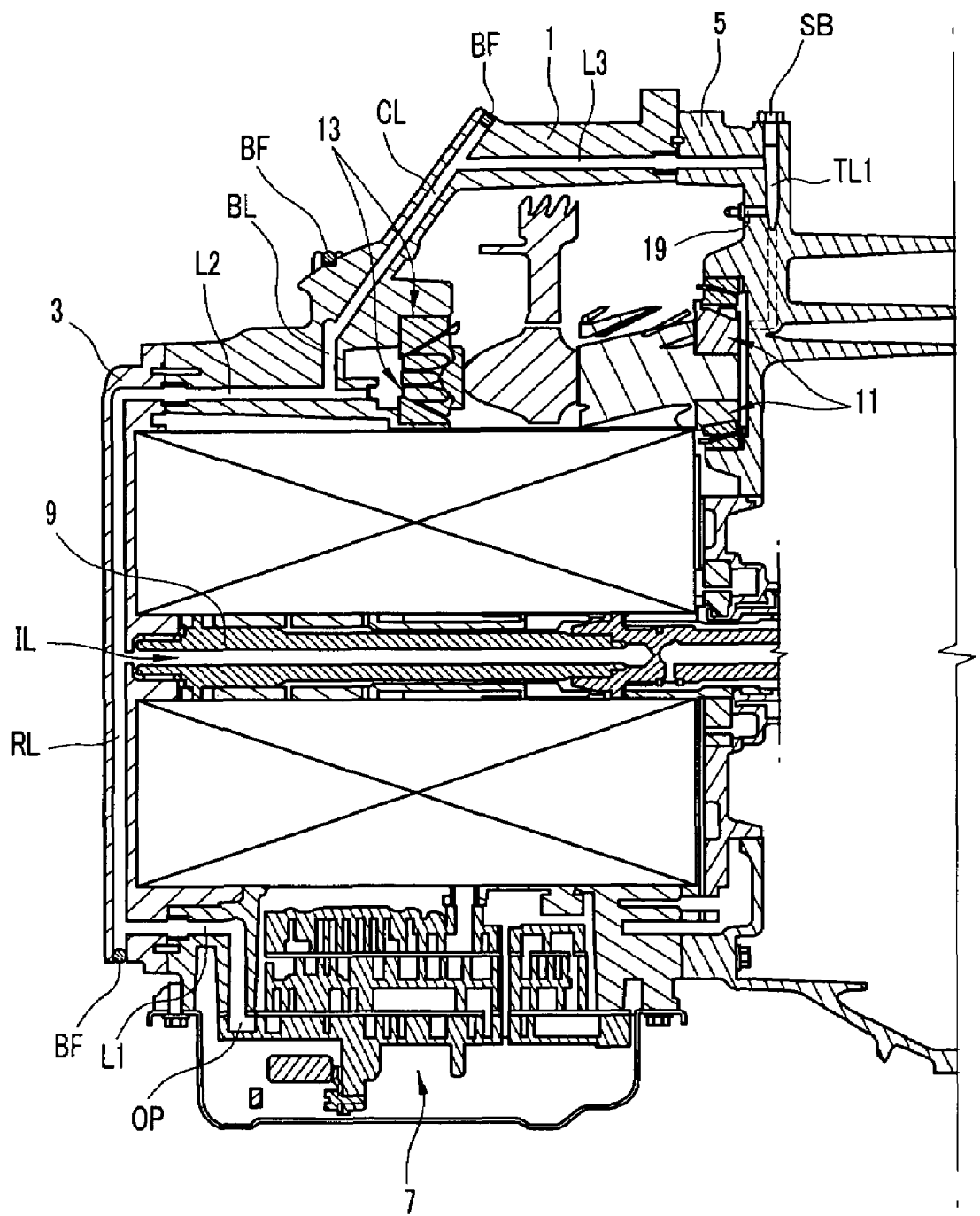
FIG. 2 is a partial cross-sectional view along line II-II of FIG. 1 showing lubricating oil lines according to an exemplary embodiment of the present invention.

According to an exemplary embodiment of the present invention, as shown in FIG. 2, an oil port OP is disposed in a valve body 7 for supplying lubricating oil. A first transmission case oil line L1 is disposed in a rear portion of a transmission case 1 and is connected with the oil port OP such that it receives lubricating oil from the oil port OP. A rear cover oil line RL is disposed along an inside of a rear cover and is connected with the first transmission case oil line L1 such that it receives lubricating oil from the first transmission case oil line L1. An internal oil line IL is disposed in an input shaft 9. The internal oil line IL is connected to the rear cover oil line RL and receives lubricating oil from the rear cover oil line RL. An end of the rear cover oil line RL neighboring the connection of the rear cover oil line RL and the first transmission case oil line L1, is closed by a ball-fitting BF.

A second transmission case oil line L2 is disposed in the rear portion of the transmission case 1 and is connected with the rear cover oil line RL. The second transmission case oil line L2 transmits lubricating oil from the rear cover oil line RL to rear transfer bearings 13. A branched oil line BL branches from the second transmission case oil line L2 and receives lubricating oil from the second transmission case oil line L2. An end of the branched oil line BL connected to an outer side of the transmission case 1 is closed by a ball fitting BF.

An inclined oil line CL is disposed along an inclined surface of the transmission case. The inclined oil line CL is connected with the branched oil line BL and receives lubricating oil from the branched oil line BL.

A third transmission case oil line L3 is disposed in the transmission case 1 and is connected to the inclined oil line CL. The third transmission case oil line L3 receives lubricating oil from the inclined oil line CL.

Figure 3:
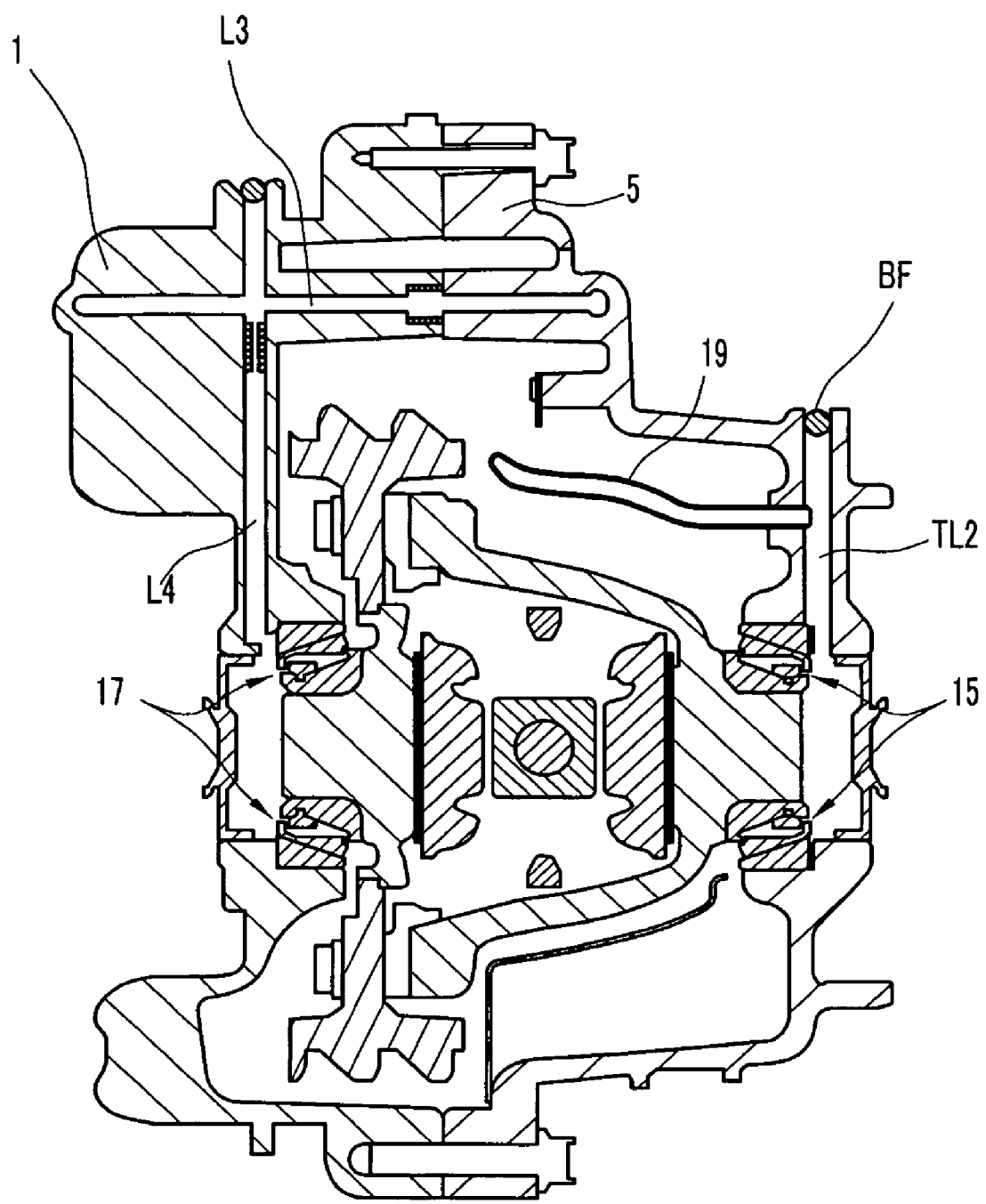
FIG. 3 is a cross-sectional view along line III-III of FIG. 1 showing lubricating oil lines according to an exemplary embodiment of the present invention.

A fourth transmission case oil line L4 (FIG. 3), which branches vertically from the third transmission case oil line L3, is disposed in the transmission case 1. The fourth transmission case oil line transmits lubricating oil from the third transmission case oil line L3 to rear differential bearings 17. An end of the fourth transmission case oil line L4 connected with an outer side of the transmission case 1 is closed by a ball fitting BF.

Figure 4:
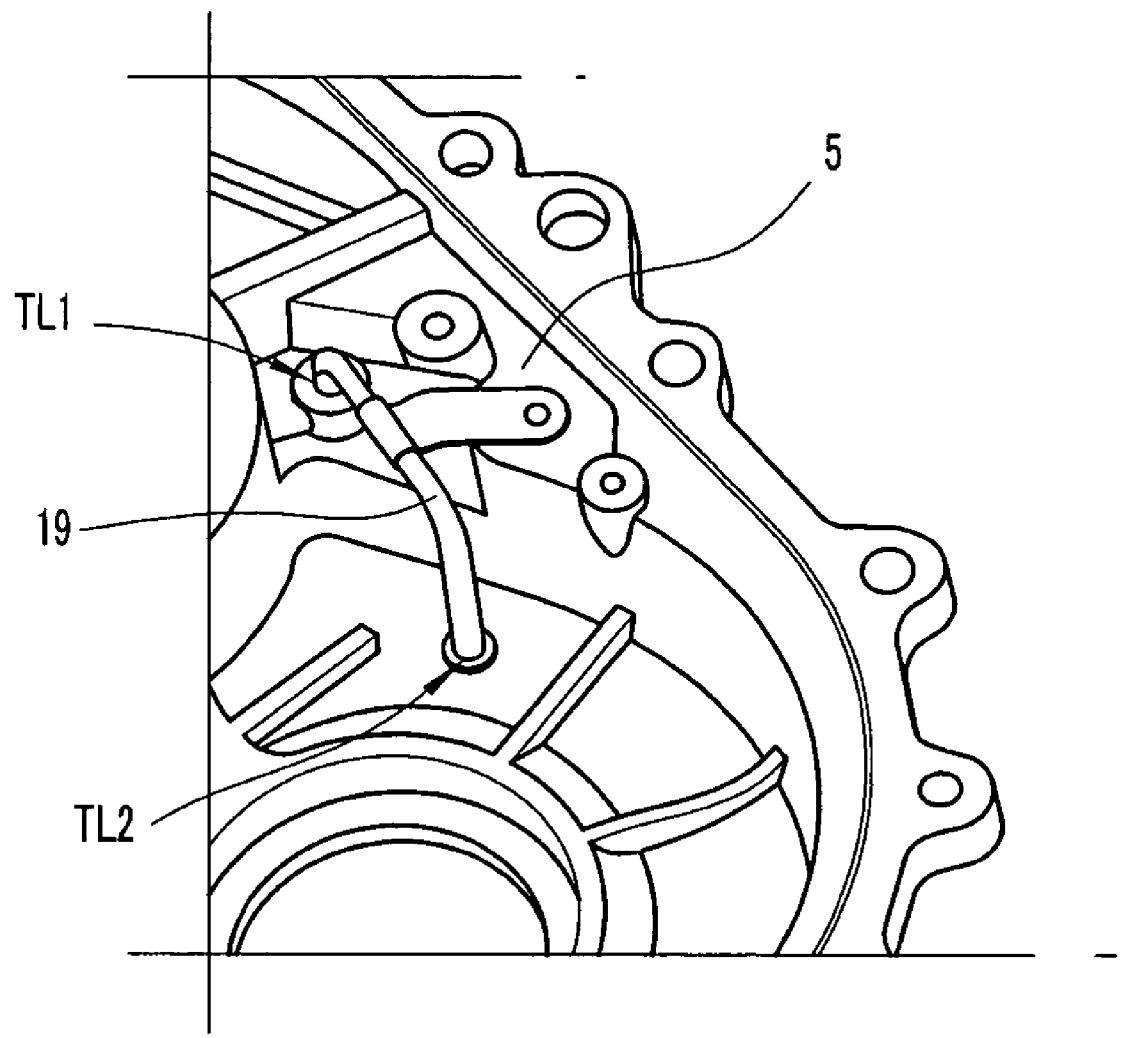
FIG. 4 is a partial perspective view of a converter housing showing a connecting pipe according to an exemplary embodiment of the present invention.

A first converter housing oil line TL1 (FIG. 2) is disposed in the converter housing 5. The first converter housing oil line TL1 transmits lubricating oil from the third transmission case oil line L3 to front transfer bearings 11. A second converter housing oil line TL2 (FIG. 3) is disposed vertically in the converter housing 5. The second converter housing oil line TL2 transmits lubricating oil to front differential bearings 15. A connecting pipe 19 connects the first converter housing oil line TL1 to the second converter housing oil line TL2 (see FIGS. 2-4).

An end of the first converter housing oil line TL1 neighboring the connection between the first converter housing oil line TL1 and the third transmission case oil line L3, is closed by a sealing bolt SB.

An end of the second converter housing oil line TL2 connected with an outer side of the converter housing 1 is closed by a ball fitting BF.

Figure 5:
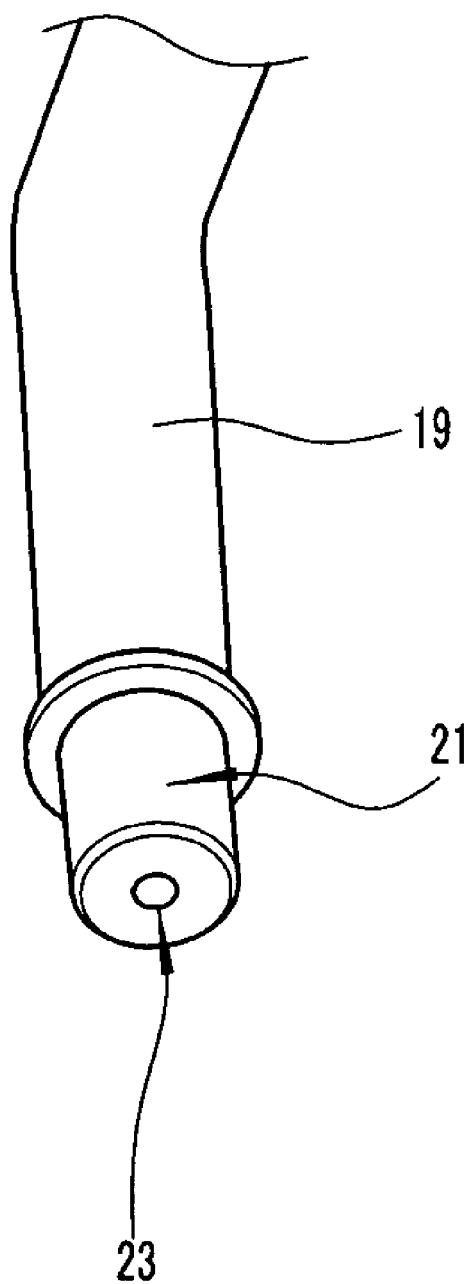
FIG. 5 is a partial perspective view of an end portion of a connecting pipe according to an exemplary embodiment of the present invention.

As shown in FIG. 5, each end 21 of the connecting pipe 19 is configured as a fixing end including a hole 23. The ends 21 of the connecting pipe 19 are connected to the first converter housing oil line TL1 and the second converter housing oil line TL2.

The system of lubricating oil lines for an automatic transmission as described above may be supplied oil directly from the oil port OP of a valve body 7 and supplies sufficient oil automatically and continually to the transfer bearings 11 and 13 and the differential bearings 15 and 17.

That is, oil is supplied to the rear transfer bearings 13 through the oil port OP of the valve body 7, the first transmission case oil line L1, the rear cover oil line RL, and the second transmission case oil line L2 sequentially.

Also, oil is supplied to the front transfer bearings 11 through the oil port OP of the valve body 7, the first transmission case oil line L1, the rear cover oil line RL, the second transmission case oil line L2, the branched oil line BL, the inclined oil line CL, the third transmission case oil line L3, and the first converter housing oil line TL1 sequentially.

Further, oil is supplied to the rear differential bearings 17 through the oil port OP of the valve body 7, the first transmission case oil line L1, the rear cover oil line RL, the second transmission case oil line L2, the branched oil line BL, the inclined oil line CL, the third transmission case oil line L3, and the fourth transmission case oil line L4 sequentially.

In addition, oil is supplied to the front differential bearings 15 through the oil port OP of the valve body 7, the first transmission case oil line L1, the rear cover oil line RL, the second transmission case oil line L2, the branched oil line BL, the inclined oil line CL, the third transmission case oil line L3, the first converter housing oil line TL1, the connecting pipe 19, and the second converter housing oil line TL2 sequentially.

Therefore, the present invention of the system of lubricating oil lines for an automatic transmission includes the lubricating oil lines in the transmission case 1, the rear cover 3, and the converter housing 5. Accordingly, the present invention transmits lubricating oil automatically and continually from the oil port OP of the valve body 7 to the transfer bearings 11 and 13 and the differential bearings 15 and 17 and thereby, the durability of the bearings may be conserved.

In particular, at the beginning of operation after a long rest, sufficient lubricating oil is supplied to the transfer bearings 11 and 13 so that the lifetime of the transfer bearings 11 and 13 may be extended and noise is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system of lubricating oil lines for an automatic transmission comprising:
   an oil port disposed in a valve body for supplying lubricating oil;
   a first transmission case oil line in a rear portion of a transmission case, connected to the oil port for receiving the lubricating oil from the oil port;
   a rear cover oil line connected to the first transmission case oil line for receiving the lubricating oil from the first transmission case oil line;
   a second transmission case oil line in the rear portion of the transmission case for transmitting lubricating oil from the rear cover oil line to rear transfer bearings;
   an internal oil line disposed in an input shaft for receiving lubricating oil from the rear cover oil line;

a branched oil line connected to the second transmission case oil line for receiving lubricating oil from the second transmission case oil line;

an inclined oil line formed along an inclined surface of the transmission case for receiving lubricating oil from the branched oil line;

a third transmission case oil line in the transmission case for receiving lubricating oil from the inclined oil line;

a fourth transmission case oil line for transmitting lubricating oil from the third transmission case oil line to rear differential bearings;

a first converter housing oil line for transmitting lubricating oil from the third transmission case oil line to front transfer bearings;

a second converter housing oil line disposed substantially vertically in a converter housing for transmitting lubricating oil to front differential bearings; and a connecting pipe connecting the first converter housing oil line to the second converter housing oil line.

2. The system of claim 1, wherein an end of the rear cover oil line, neighboring a connection of the rear cover oil line and the first transmission case oil line, comprises a ball-fitting.

3. The system of claim 1, wherein an end of the branched oil line, connected to an outer side of the transmission case, comprises a ball fitting.

4. The system of claim 1, wherein an end of the inclined oil line, connected to an outer side of the transmission case, comprises a ball fitting.

5. The system of claim 1, wherein an end of the fourth transmission case oil line, connected to an outer side of the transmission case, comprises a ball fitting.

6. The system of claim 1, wherein an end of the first converter housing oil line, neighboring a connection of the first converter housing oil line and the third transmission case oil line, comprises a sealing bolt.

7. The system of claim 1, wherein an end of the second converter housing oil line, connected to an outer side of the converter housing, comprises a ball fitting.

8. The system of claim 1, wherein oil is supplied to the rear transfer bearings through the oil port, the first transmission case oil line, the rear cover oil line, and the second transmission case oil line sequentially.

9. The system of claim 1, wherein oil is supplied to the front transfer bearings through the oil port, the first transmission case oil line, the rear cover oil line, the second transmission case oil line, the branched oil line, the inclined oil line, the third transmission case oil line, and the first converter housing oil line sequentially.

10. The system of claim 1, wherein oil is supplied to the rear differential bearings through the oil port, the first transmission case oil line, the rear cover oil line, the second transmission case oil line, the branched oil line, the inclined oil line, the third transmission case oil line, and the fourth transmission case oil line sequentially.

11. The system of claim 1, wherein oil is supplied to the front differential bearings through the oil port, the first transmission case oil line, the rear cover oil line, the second transmission case oil line, the branched oil line, the inclined oil line, the third transmission case oil line, the first converter housing oil line, the connecting pipe, and the second converter housing oil line sequentially.

12. The system of claim 1, wherein the connecting pipe comprises first and second ends, each comprising a hole, wherein the first end is connected to the first converter housing oil line, and the second end is connected to the second converter housing oil line.

* * * * *